United States Patent
Sun et al.

(10) Patent No.: US 6,396,687 B1
(45) Date of Patent: May 28, 2002

(54) ROTATING PORTABLE COMPUTER DOCKING STATION

(75) Inventors: Cecilia H. Sun; Reynold L. Liao, both of Austin; Sean P. O'Neal, Round Rock, all of TX (US)

(73) Assignee: Dell Products, L.P., Round Rock, TX (US)

(*) Notice: Subject to any disclaimer, the term of this patent is extended or adjusted under 35 U.S.C. 154(b) by 0 days.

(21) Appl. No.: 09/687,854

(22) Filed: Oct. 13, 2000

(51) Int. Cl.[7] .................................................. G06F 1/16
(52) U.S. Cl. ..................... 361/686; 361/725; 312/223.2; D14/100
(58) Field of Search .................... 361/686, 680–683, 361/725–727, 741, 754, 756; D6/397, 396; D14/100, 114; 439/607; 312/223.1, 223.2

(56) References Cited

U.S. PATENT DOCUMENTS

| | | | |
|---|---|---|---|
| 5,313,596 A | 5/1994 | Swindler et al. | 395/325 |
| 5,452,180 A * | 9/1995 | Register et al. | 361/686 |
| 5,552,959 A | 9/1996 | Penniman et al. | 361/686 |
| 5,568,359 A | 10/1996 | Cavello et al. | 361/686 |
| 5,579,528 A | 11/1996 | Register | 395/671 |
| 5,699,226 A | 12/1997 | Cavello | 361/686 |
| 5,991,838 A | 11/1999 | Swindler et al. | 710/101 |
| 6,188,572 B1 * | 2/2001 | Liao et al. | 361/686 |
| 6,282,082 B1 * | 8/2001 | Armitage et al. | 361/681 |

OTHER PUBLICATIONS

U.S. application No. 09/170,907, Reynold L. Liao and Sean P. O'Neal, *Movable Docking Station Electrical Connector,* Filed Oct. 13, 1998.

* cited by examiner

*Primary Examiner*—Darren Schuberg
*Assistant Examiner*—Hung Van Duong
(74) *Attorney, Agent, or Firm*—Skjerven Morrill MacPherson LLP

(57) ABSTRACT

An apparatus and method are presented for making the cable connectors of a docking port more easily accessible for coupling and decoupling peripheral devices to the docking port. An advantage of the present invention is that it provides for easier accessibility with a minimum of moving parts and mechanisms by providing for the rotation of part of the docking port to make the port's connectors more easily accessible to a computer user.

20 Claims, 2 Drawing Sheets

ROTATING PORTABLE COMPUTER DOCKING STATION

BACKGROUND OF THE INVENTION

1. Field of the Invention

This invention relates in general to computer systems and more specifically to docking apparatuses used in conjunction with portable computers.

2. Description of the Related Art

Computer systems are information-handling systems that can be designed to give independent computing power to one user or a plurality of users. Computer systems may be found in many forms including, for example, mainframes, minicomputers, workstations, servers, personal computers, internet terminals, notebook or portable computers, and embedded systems. Personal computer ("PC") systems, such as International Business Machines-compatible PC systems, include desktop, floor standing, or portable versions. A typical PC system includes a microprocessor (or simply "processor"), associated memory and logic control, and a number of peripheral devices that provide input and output for the system. Such peripheral devices may include display monitors, keyboards, mouse-type input devices, floppy and hard disk drives, printers, network cards, terminal devices, modems, televisions, sound devices, voice recognition devices, electronic pen devices, and mass storage devices such as tape drives, CD-R drives, or DVDs.

Portable computers (including laptop or notebook computers) have become increasingly popular due to their light weight and small size. Such computers can be easily hand-carried in briefcase-sized cases and may be used by business travelers in cramped spaces, such as on airline seatback trays. In addition, portable computers typically can be battery-powered or powered from an AC-to-DC converter. Portable computers typically incorporate a flat panel display such as a liquid crystal display or other small display that can be, for example, built into its lid portion. Portable computers typically include a keyboard built into its main body portion. The modem portable computer may also have incorporated hard and floppy disk drives, system RAM memory, and a system processor. A portable computer can be a fully self-contained computer system able to be used conveniently in situations and locations in which the use of a much larger desktop computer is not feasible.

A docking station allows a portable computer to be used as a desktop computer for use in the home or office. Docking stations typically make easier the operable coupling of the system processor and memory of the portable computer to peripheral devices either housed in the docking station (e.g., a CD-ROM drive) or operably coupled to the docking station (e.g., an external mouse, keyboard, monitor, or printer). Such peripheral devices, which are operably coupled to connectors located on the docking station housing, are typically left at the home or office when the portable computer is removed for use outside the home or office. Docking station housings are typically designed to be set on a desktop. However, some docking station housings may be floor standing as well. One example of a docking station is the PORT REPLICATOR II sold by DELL COMPUTER CORP.

A challenge presented by the design of most common docking stations is that it is often very difficult to access the back of the docking station when connecting peripheral cables because of the position of the cable connectors at the rear of the docking station.

What is needed is an apparatus and method for making the cable connectors of a docking port more easily accessible.

SUMMARY OF THE INVENTION

In accordance with the present invention, an improved docking station for use in conjunction with a portable computer is presented. In one embodiment, the docking station has a receiving area for placement of a portable computer such that a connector or connectors for peripherals on the outer surface of the portable computer couple to a connector or connectors within the docking port receiving area when the portable computer is placed into the receiving area. The receiving area has guiding rails to guide the personal computer to make easier coupling the portable computer connectors and the base member receiving connectors. The docking port has a rotating member that has peripheral connectors that are coupled to the connectors in the receiving area. The rotating member can be rotated such that the rotating member peripheral connectors are more accessible to the computer user than they would be if they faced away from the user on the outer surface of the docking port.

Another embodiment of the present invention includes a latching mechanism that holds the rotating member substantially stationary relative to the member with the receiving area (the "base member") when the user does not want the rotating member rotated for easier access to the rotating member's peripheral connectors. When rotating is desired, the user can release the latch and rotate the rotating member. The latching mechanism remains released during rotation of the rotating member to, while the rotating member is positioned at, and during rotation of the rotating member from the position of easier accessibility and re-engages when the rotating member is returned to its original latched position.

Another embodiment of the present invention uses friction to hold the rotating member in place relative to the member with the receiving area. Surfaces of the rotating member and the base member with the receiving are in contact with each other, and friction between some or all of these contacting surfaces is sufficient in this embodiment to hold the two members substantially stationary relative to each other unless and until the friction is overcome by the user in moving the rotating member to another position.

Another embodiment of the present invention uses a combination of the latching mechanism described above and the friction mechanism described above to hold the rotating member in place relative to the member with the receiving area at every point in the rotating member's range of motion.

An advantage of the present invention is that it provides for easier accessibility to a docking port's cable connectors with a minimum of moving parts and mechanisms.

BRIEF DESCRIPTION OF THE DRAWINGS

The present invention may be better understood, and its numbers objects, features and advantages made apparent to those skilled in the art by referencing the accompanying drawings. The use of the same reference number throughout the several figures designates a like or similar element.

DETAILED DESCRIPTION

The following sets forth a detailed description of a mode for carrying out the invention. The description is intended to be illustrative of the invention and should not be taken to be limiting.

Figure 1:
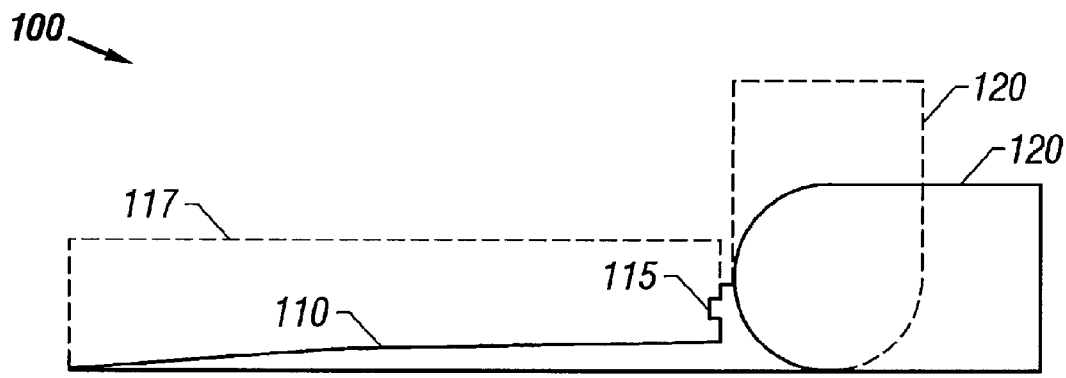
FIG. 1 shows an exterior side view of a first embodiment of the present invention.

Referring to FIG. 1, an exterior side view of a first embodiment of the present invention 100 is shown. Base member 110 is the member with which a portable computer (not shown) docked to the invention will be in physical contact. To dock a portable computer, the computer is placed in receiving area 117, indicated approximately for purposes of illustration by a phantom line in FIG. 1. Base member 110 includes one or more base member peripheral connectors 115 for coupling peripheral devices (not shown) to the portable computer through the docking station 100. Solid lines depict rotating member 120 in the position to be used when a user is not coupling or decoupling peripheral devices to the rotating member peripheral connectors (not shown). Phantom lines depict rotating member 120 in the position for connection of peripheral devices to one or more rotating member peripheral connectors (not shown). With rotating member 120 in the position shown by solid lines, a user would dock a portable computer to this embodiment 100, connecting one or more peripheral connectors on the outer surface of the portable computer to one or more base member peripheral connectors 115. The user would then rotate rotating member 120 to the position shown by phantom lines for easier access to one or more rotating member peripheral connectors. After coupling the desired peripheral devices to the rotating member peripheral connectors, the user could rotate the rotating member 120 back to the position shown by solid lines and use the portable computer. The user could also rotate rotating member 120 to the position shown by phantom lines for easier access to one or more rotating member peripheral connectors, couple peripherals to the rotating member peripheral connectors, and then dock a portable computer to the docking station 100.

Figure 2A:
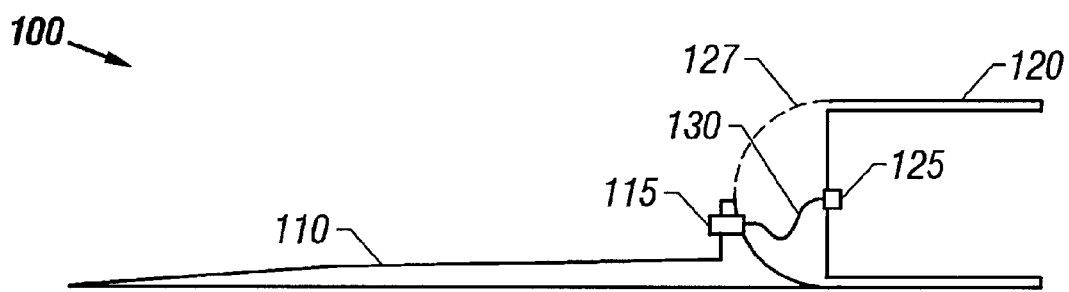
FIGS. 2A and 2B show cross-sectional views of a first embodiment of the present invention.

Referring to FIG. 2A, a cross section of a first embodiment of the present invention is shown. Rotating member 120 is shown in a position corresponding to the position shown by solid lines in FIG. 1. Interconnecting member 130, which couples one or more base member peripheral connectors 115 with one or more rotating member peripheral connectors 125, is represented for purpose of illustration by a flexible cable. The phantom line depicting part of the curved surface of rotating member 120 represents an opening 127 in rotating member 120 through which interconnecting member 130 runs to couple connectors 115 to connectors 125. Opening 127 permits interconnecting member 130 to couple connectors 115 to connectors 125 throughout the range of motion of rotating member 120.

Figure 2B:
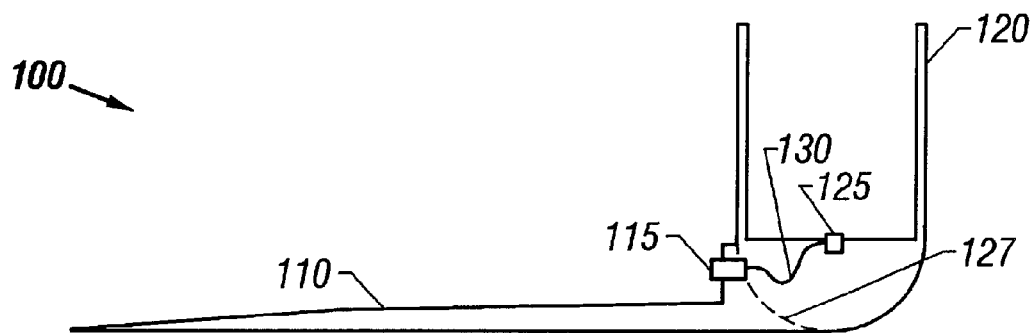

Referring to FIG. 2B, another cross section of a first embodiment of the present invention is shown. Rotating member 120 is shown in a position corresponding to the position shown by phantom lines in FIG. 1. Interconnecting member 130, which couples one or more base member peripheral connectors 115 with one or more rotating member peripheral connectors 125, is represented for purpose of illustration by a flexible cable. The phantom line depicting part of the curved surface of rotating member 120 represents an opening 127 in rotating member 120 through which interconnecting member 130 runs to couple connectors 115 to connectors 125. Opening 127 permits interconnecting member 130 to couple connectors 115 to connectors 125 throughout the range of motion of rotating member 120.

Figure 3A:
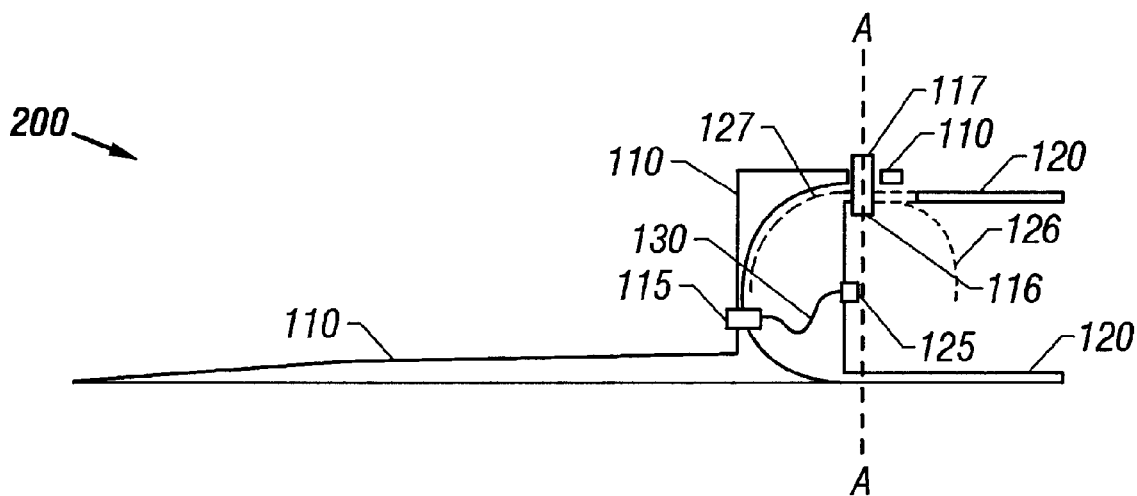
FIGS. 3A and 3B show cross-sectional views of a second embodiment of the present invention.
Figure 3B:
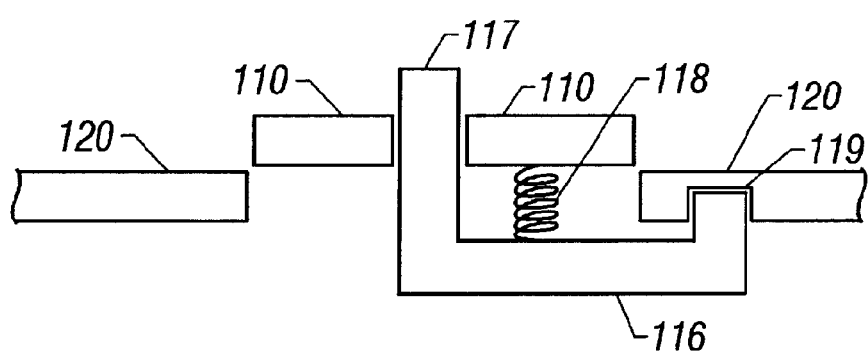

Referring to FIG. 3A, a cross-sectional view of a second embodiment of the present invention 200 is shown. Referring to FIG. 3B, a cross sectional view of part of the second embodiment 200 along the line AA in FIG. 3A is shown. This embodiment includes a latching mechanism that holds the rotating member 120 substantially fixed relative to the base member 110 when the user does not want the rotating member 120 rotated for easier access to the rotating member peripheral connectors 125. When rotating is desired, the user can release the latch 116 by pressing button 117, overcoming the holding force exerted by spring mechanism 118 (not shown in FIG. 3A), and rotate rotating member 120. When rotating member 120 is at the position shown by solid lines in FIG. 1, the latch is engaged while placed in indentation 119 (not shown in FIG. 3A) on the inner surface of rotating member 120 such that rotating member 120 is held substantially fixed relative to base member 110. Indentation 119 surrounds latch 116 such that when rotating member 120 is in this position, motion by rotating member 120 into and out of the plane of the cross-section is restricted. When the user presses button 117, overcoming the holding force exerted by spring mechanism 118, the latch is removed from indentation 119 and rotating member 120 is free to rotate. During rotating to and from the position shown by phantom lines in FIG. 1, and while rotating member 120 is positioned at the position of easier accessibility shown by phantom lines in FIG. 1, the latch presses against the inner curved surface 126 of rotating member 120 without catching, such that rotating member 120 is free to rotate. After coupling the desired peripheral devices to the rotating member peripheral connectors, the user could rotate the rotating member 120 back to the position shown by solid lines in FIG. 1. In this position, the latch would catch when spring mechanism 118 forced latch 116 back into indentation 119, holding rotating member 120 substantially fixed relative to base member 110.

One skilled in the art will recognize that the foregoing components and devices in FIGS. 1, 2A, 2B, 3A, and 3B are used as examples for the sake of conceptual clarity and that various configuration modifications are common. Consequently, as used herein the specific exemplars set forth in FIG. 1, 2A, 2B, 3A, and 3B are intended to be representative of their more general classes. In general, use of any specific exemplar herein is also intended to be representative of its class, and the non-inclusion of such specific devices in the foregoing list should not be taken as indicating that limitation is desired.

What is claimed is:

1. An apparatus comprising:
    a base member including
        a receiving area dimensioned to accommodate placement of a portable computer including a processor, a memory coupled to the processor, and a connector coupled to the processor and
        a connector disposed within the receiving area such that when the portable computer is placed into the base member receiving area the connector couples with the portable computer connector;
    a rotating member rotatably attached to the base member including a connector coupled to the base member connector; and
    a mechanism capable of holding the rotating member in a substantially fixed position relative to the base member when the mechanism is engaged and capable of permitting the rotating member to rotate through the entire range of motion through which the rotating member is capable of rotating when the mechanism is disengaged.

2. The apparatus of claim 1 wherein the mechanism further includes a latch such that the mechanism is disengaged when the latch is released.

3. The apparatus of claim 1 wherein the mechanism remains disengaged when the rotating member is rotated from the position in which the mechanism holds the rotating member substantially fixed.

4. The apparatus of claim 1 wherein the mechanism holds the rotating member fixed at an extreme point in the range of motion through which the rotating member is capable of being rotated.

5. The apparatus of claim 1, further comprising a mechanism
   operably connected to the base member;
   capable of holding the rotating member in a substantially fixed position relative to the base member when the mechanism is engaged; and
   capable of permitting the rotating member to rotate through the entire range of motion through which the rotating member is capable of rotating when the mechanism is disengaged.

6. The computer system of claim 1, further comprising a mechanism
   operably connected to the base member;
   capable of holding the rotating member in a substantially fixed position relative to the base member when the mechanism is engaged; and
   capable of permitting the rotating member to rotate through the entire range of motion through which the rotating member is capable of rotating when the mechanism is disengaged.

7. The apparatus of claim 2 wherein the mechanism further includes a button that releases the latch when the button is depressed.

8. The apparatus of claim 3 wherein the mechanism engages when the rotating member is rotated from a position substantially different from the position in which the mechanism holds the rotating member substantially fixed to the position in which the mechanism holds the rotating member substantially fixed.

9. The apparatus of claim 5 wherein the fixture further includes a guiding rail.

10. The computer system of claim 6 wherein the fixture further includes a guiding rail.

11. A computer system, comprising:
    a portable computer including
       a processor,
       a memory coupled to the processor, and
       a connector coupled to the processor;
    an apparatus including
       a base member including
          a receiving area dimensioned to accommodate placement of the portable computer and
          a connector disposed within the receiving area such that when the portable computer is placed into the base member receiving area the connector couples with the portable computer connector and
       a rotating member rotatably attached to the base member including a connector coupled to the base member connector; and
       a mechanism capable of holding the rotating member in a substantially fixed position relative to the base member when the mechanism is engaged and capable of permitting the rotating member to rotate through the entire range of motion through which the rotating member is capable of rotating when the mechanism is disengaged.

12. The computer system of claim 11 wherein the mechanism further includes a latch such that the mechanism is disengaged when the latch is released.

13. The computer system of claim 11 wherein the latch remains released when, after being depressed and the rotating member is rotated from the position in which the mechanism holds the rotating member substantially fixed, the button is released.

14. The computer system of claim 11 wherein the mechanism holds the rotating member fixed at an extreme point in the range of motion through which the rotating member is capable of being rotated.

15. The computer system of claim 12 wherein the mechanism further includes a button that releases the latch when the button is depressed.

16. The computer system of claim 13 wherein the mechanism engages when the rotating member is rotated from a position substantially different from the position in which the mechanism holds the rotating member substantially fixed to the position in which the mechanism holds the rotating member substantially fixed.

17. An apparatus comprising:
    a base member including
       a receiving area dimensioned to accommodate placement of a portable computer including a processor, a memory coupled to the processor, and a connector coupled to the processor and
       a connector disposed within the receiving area such that when the portable computer is placed into the base member receiving area the connector couples with the portable computer connector;
    a rotating member rotatably attached to the base member including a connector coupled to the base member connector; and
    wherein the base member and the rotating member contact each other such that friction between a base member surface in contact with a rotating member surface holds the rotating member substantially fixed relative to the base member until a user exerts force on the rotating member or the base member to overcome the friction to move the rotating member to another position relative to the base member.

18. An apparatus comprising:
    a base member including
       a receiving area dimensioned to accommodate placement of a portable computer including a processor, a memory coupled to the processor, and a connector coupled to the processor and
       a connector disposed within the receiving area such that when the portable computer is placed into the base member receiving area the connector couples with the portable computer connector;
    a rotating member rotatably attached to the base member including a connector coupled to the base member connector; and
    wherein the base member and the rotating member contact each other such that friction between a base member surface in contact with a rotating member surface holds the rotating member substantially fixed relative to the base member until a user exerts force on the rotating member or the base member to overcome the friction to move the rotating member to another position relative to the base member.

19. An apparatus comprising:
    a base member including
       a receiving area dimensioned to accommodate placement of a portable computer including a processor, a memory coupled to the processor, and a peripheral connector coupled to the processor and
       a peripheral connector disposed within the receiving area such that when the portable computer is placed into the base member receiving area the peripheral connector couples with the portable computer peripheral connector;
    a rotating member rotatably attached to the base member including a peripheral connector coupled to the base member peripheral connector.

20. A computer system, comprising:

a portable computer including
- a processor,
- a memory coupled to the processor, and
- a peripheral connector coupled to the processor; and an apparatus including
- a base member including
  - a receiving area dimensioned to accommodate placement of the portable computer and
  - a peripheral connector disposed within the receiving area such that when the portable computer is placed into the base member receiving area the peripheral connector couples with the portable computer peripheral connector and
- a rotating member rotatably attached to the base member including a peripheral connector coupled to the base member peripheral connector.

* * * * *

UNITED STATES PATENT AND TRADEMARK OFFICE
CERTIFICATE OF CORRECTION

PATENT NO.    : 6,396,687 B1
DATED         : May 28, 2002
INVENTOR(S)   : Sun, Cecilia H., Liao, Reynold L. and O'Neal, Sean P.

It is certified that error appears in the above-identified patent and that said Letters Patent is hereby corrected as shown below:

<u>Column 5,</u>
Line 11, after "The" delete "computer system" and insert -- apparatus --.
Line 32, after "A" delete "computer system" and insert -- apparatus --.

Signed and Sealed this

Twenty-sixth Day of August, 2003

JAMES E. ROGAN
*Director of the United States Patent and Trademark Office*